US010817129B2

(12) United States Patent
Reid et al.

(10) Patent No.: US 10,817,129 B2
(45) Date of Patent: Oct. 27, 2020

(54) METHODS, SYSTEMS, AND MEDIA FOR PRESENTING MEDIA CONTENT PREVIEWS

(71) Applicant: Google LLC, Mountain View, CA (US)

(72) Inventors: Bryce Reid, Menlo Park, CA (US); David Worsham, San Francisco, CA (US); Andrey Doronichev, San Francisco, CA (US); Joshua Austin, San Francisco, CA (US)

(73) Assignee: Google LLC, Mountain View, CA (US)

( * ) Notice: Subject to any disclaimer, the term of this patent is extended or adjusted under 35 U.S.C. 154(b) by 57 days.

(21) Appl. No.: 15/951,673

(22) Filed: Apr. 12, 2018

(65) Prior Publication Data
US 2019/0018568 A1 Jan. 17, 2019

Related U.S. Application Data

(60) Provisional application No. 62/533,556, filed on Jul. 17, 2017.

(51) Int. Cl.
G06F 3/0481 (2013.01)
G06F 3/0482 (2013.01)
(Continued)

(52) U.S. Cl.
CPC .......... G06F 3/04815 (2013.01); G06F 3/012 (2013.01); G06F 3/0482 (2013.01);
(Continued)

(58) Field of Classification Search
CPC .... G06F 3/04815; G06F 3/0482; G06F 3/012; H04N 13/344
See application file for complete search history.

(56) References Cited

U.S. PATENT DOCUMENTS 10,203,752 B2 * 2/2019 Fateh ................ G06F 3/147
2012/0092469 A1 * 4/2012 Kovalick ............ H04N 13/356
348/56

(Continued)

OTHER PUBLICATIONS

"Konferencja: XL-th IEEE—SPIE Joint Symposium Wilga 2017", Jun. 24, 2017, pp. 1-18.

(Continued)

Primary Examiner — Daeho D Song
(74) Attorney, Agent, or Firm — Byrne Poh LLP

(57) ABSTRACT

Methods, systems, and media for presenting media content previews are provided. In some embodiments, the method comprises: causing a plurality of thumbnail images to be presented on a page presented on a user device, wherein each thumbnail image represents a media content item available for presentation on the user device, and wherein the user device is associated with a headset display; determining that a viewpoint of the headset display is directed to one of the thumbnail images of the plurality of thumbnail images; in response to determining that the viewpoint of the headset display is directed to the one of the thumbnail images, causing a first view of a content preview corresponding to the one of the thumbnail images to be presented on the headset display, wherein the content preview includes a second view that is different than and does not include the first view; detecting that the viewpoint of the headset display has changed in a direction toward the second view of the content preview; in response to detecting that the viewpoint of the headset display has changed in the direction toward the second view of the content preview, causing the second view of the content preview to be presented on the headset display; determining that the viewpoint of the headset display is no longer directed to the content preview; and in response to determining that the viewpoint of the headset display is no longer directed to the content preview, causing (Continued)

presentation of the second view of the content preview to be inhibited and causing presentation of the plurality of thumbnail images to resume on the headset display.

21 Claims, 5 Drawing Sheets

(51) Int. Cl.
  *G06F 3/01* (2006.01)
  *H04N 13/344* (2018.01)
  *G06F 16/74* (2019.01)
  *G06F 16/738* (2019.01)

(52) U.S. Cl.
  CPC .......... *G06F 16/739* (2019.01); *G06F 16/743* (2019.01); *H04N 13/344* (2018.05)

(56) References Cited

U.S. PATENT DOCUMENTS

| | | | | |
|---|---|---|---|---|
| 2013/0002666 A1* | 1/2013 | Mihara | ................ | H04N 13/341 345/419 |
| 2014/0362113 A1* | 12/2014 | Benson | ................... | G06T 11/00 345/633 |
| 2015/0085171 A1* | 3/2015 | Kim | ..................... | G02B 27/017 348/333.04 |
| 2015/0260999 A1* | 9/2015 | Wang | ................ | G02F 1/133526 349/15 |
| 2015/0331242 A1* | 11/2015 | Cho | ........................ | H04N 5/265 345/8 |
| 2016/0323560 A1* | 11/2016 | Jin | ..................... | H04N 5/23238 |
| 2016/0337630 A1* | 11/2016 | Raghoebardajal | ... | H04N 13/128 |
| 2017/0078654 A1 | 3/2017 | Facin et al. | | |
| 2017/0115728 A1* | 4/2017 | Park | ....................... | G06F 3/0482 |
| 2017/0221264 A1* | 8/2017 | Perry | ...................... | G06F 3/011 |
| 2017/0354883 A1* | 12/2017 | Benedetto | ............... | G06T 19/20 |
| 2018/0232108 A1* | 8/2018 | Masuda | ................ | G06F 3/0481 |

OTHER PUBLICATIONS

International Search Report and Written Opinion dated Aug. 3, 2018 in International Patent Application No. PCT/2018/027267.

Khanwalkar et al., "Exploration of Large Image Corpuses in Virtual Reality", in ACM on Multimedia Conference, New York, NY, US, Oct. 1, 2016, pp. 596-600.

Pilarczyk et al., "Virtual Reality for Spherical Images", in IEEE—SPIE Joint Symposium, Wilga, PL, vol. 10445, May 30, 2017, pp. 1-9.

Heijdens et al., "360 Video & Virtual Reality (VR) in JW Player Part 1 : State of the Industry," JW Player, Oct. 27, 2016, pp. 1-8.

* cited by examiner

METHODS, SYSTEMS, AND MEDIA FOR PRESENTING MEDIA CONTENT PREVIEWS

CROSS-REFERENCE TO RELATED APPLICATIONS

This application claims the benefit of U.S. Provisional Patent Application No. 62/533,556, filed Jul. 17, 2017, which is hereby incorporated by reference herein in its entirety.

TECHNICAL FIELD

The disclosed subject matter relates to methods, systems, and media for presenting media content previews.

BACKGROUND

People frequently browse for a video to watch on a user device, for example, on a web page that indicates videos that are available through a particular video hosting service. Additionally, as virtual reality devices and head-mounted displays become more common, people may want to watch a video as a three-dimensional or immersive video. However, it can be difficult while browsing available videos to determine how the video would look when rendered as three-dimensional or immersive content.

Accordingly, it is desirable to provide new methods, systems, and media for presenting media content previews.

SUMMARY

In accordance with various embodiments of the disclosed subject matter, methods, systems, and media for presenting media content previews are provided.

In accordance with some embodiments of the disclosed subject matter, a method for presenting media content previews is provided, the method comprising: causing a plurality of thumbnail images to be presented on a page presented on a user device, wherein each thumbnail image represents a media content item available for presentation on the user device, and wherein the user device is associated with a headset display; determining that a viewpoint of the headset display is directed to one of the thumbnail images of the plurality of thumbnail images; in response to determining that the viewpoint of the headset display is directed to the one of the thumbnail images, causing a first view of a content preview corresponding to the one of the thumbnail images to be presented on the headset display, wherein the content preview includes a second view that is different than and does not include the first view; detecting that the viewpoint of the headset display has changed in a direction toward the second view of the content preview; in response to detecting that the viewpoint of the headset display has changed in the direction toward the second view of the content preview, causing the second view of the content preview to be presented on the headset display; determining that the viewpoint of the headset display is no longer directed to the content preview; and in response to determining that the viewpoint of the headset display is no longer directed to the content preview, causing presentation of the second view of the content preview to be inhibited and causing presentation of the plurality of thumbnail images to resume on the headset display.

In some embodiments, the method further comprises: determining that the viewpoint of the headset display has changed to be angled toward the content preview; and in response to determining that the viewpoint of the headset display has changed to be angled toward the content preview, causing presentation of the content preview to occupy a larger display area.

In some embodiments, the method further comprises presenting the content preview as stereoscopic content.

In some embodiments, the method further comprises causing audio content associated with the content preview to be presented in connection with presentation of the content preview.

In some embodiments, determining that the viewpoint of the headset display has changed toward the second view is based on data from a motion sensor associated with the headset display.

In some embodiments, causing presentation of the second view of the content preview to be inhibited and causing presentation of the plurality of thumbnail images to resume comprises fading from the second view of the content preview to a page that includes the plurality of thumbnail images.

In some embodiments, the content preview comprises a subset of the corresponding media content item.

In accordance with some embodiments of the disclosed subject matter, a system for presenting media content previews is provided, the system comprising a memory and a hardware processor that, when executing computer executable instructions stored in the memory, is configured to: cause a plurality of thumbnail images to be presented on a page presented on a user device, wherein each thumbnail image represents a media content item available for presentation on the user device, and wherein the user device is associated with a headset display; determine that a viewpoint of the headset display is directed to one of the thumbnail images of the plurality of thumbnail images; in response to determining that the viewpoint of the headset display is directed to the one of the thumbnail images, cause a first view of a content preview corresponding to the one of the thumbnail images to be presented on the headset display, wherein the content preview includes a second view that is different than and does not include the first view; detect that the viewpoint of the headset display has changed in a direction toward the second view of the content preview; in response to detecting that the viewpoint of the headset display has changed in the direction toward the second view of the content preview, cause the second view of the content preview to be presented on the headset display; determine that the viewpoint of the headset display is no longer directed to the content preview; and in response to determining that the viewpoint of the headset display is no longer directed to the content preview, cause presentation of the second view of the content preview to be inhibited and causing presentation of the plurality of thumbnail images to resume on the headset display.

In accordance with some embodiments of the disclosed subject matter, a non-transitory computer-readable medium containing computer executable instructions that, when executed by a processor, cause the processor to perform a method for presenting media content previews is provided, the method comprising: causing a plurality of thumbnail images to be presented on a page presented on a user device, wherein each thumbnail image represents a media content item available for presentation on the user device, and wherein the user device is associated with a headset display; determining that a viewpoint of the headset display is directed to one of the thumbnail images of the plurality of thumbnail images; in response to determining that the viewpoint of the headset display is directed to the one of the thumbnail images, causing a first view of a content preview corresponding to the one of the thumbnail images to be presented on the headset display, wherein the content preview includes a second view that is different than and does not include the first view; detecting that the viewpoint of the headset display has changed in a direction toward the second view of the content preview; in response to detecting that the viewpoint of the headset display has changed in the direction toward the second view of the content preview, causing the second view of the content preview to be presented on the headset display; determining that the viewpoint of the headset display is no longer directed to the content preview; and in response to determining that the viewpoint of the headset display is no longer directed to the content preview, causing presentation of the second view of the content preview to be inhibited and causing presentation of the plurality of thumbnail images to resume on the headset display.

In accordance with some implementations of the disclosed subject matter, a system for presenting media content previews is provided, the system comprising: means for causing a plurality of thumbnail images to be presented on a page presented on a user device, wherein each thumbnail image represents a media content item available for presentation on the user device, and wherein the user device is associated with a headset display; means for determining that a viewpoint of the headset display is directed to one of the thumbnail images of the plurality of thumbnail images; means for causing a first view of a content preview corresponding to the one of the thumbnail images to be presented on the headset display in response to determining that the viewpoint of the headset display is directed to the one of the thumbnail images, wherein the content preview includes a second view that is different than and does not include the first view; means for detecting that the viewpoint of the headset display has changed in a direction toward the second view of the content preview; means for causing the second view of the content preview to be presented on the headset display in response to detecting that the viewpoint of the headset display has changed in the direction toward the second view of the content preview; means for determining that the viewpoint of the headset display is no longer directed to the content preview; and means for causing presentation of the second view of the content preview to be inhibited and causing presentation of the plurality of thumbnail images to resume on the headset display in response to determining that the viewpoint of the headset display is no longer directed to the content preview.

BRIEF DESCRIPTION OF THE DRAWINGS

Various objects, features, and advantages of the disclosed subject matter can be more fully appreciated with reference to the following detailed description of the disclosed subject matter when considered in connection with the following drawings, in which like reference numerals identify like elements.

DETAILED DESCRIPTION

Figure 1A:
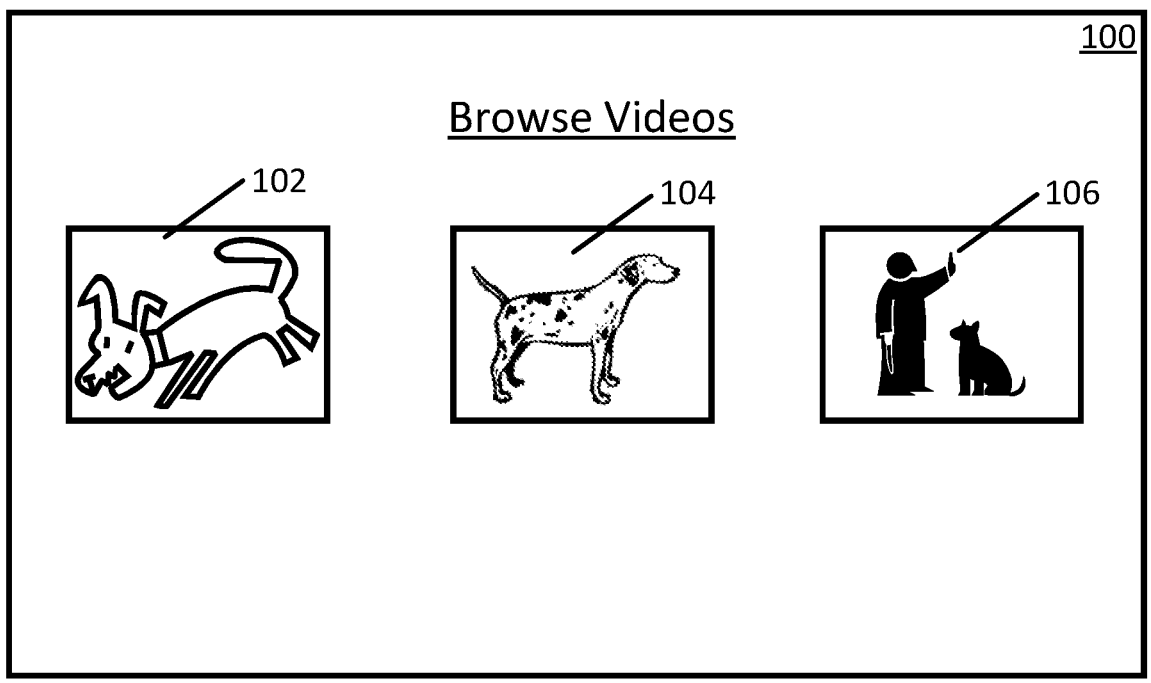
FIGS. 1A-1C show illustrative examples of user interfaces for presenting media content previews in accordance with some embodiments of the disclosed subject matter.

In accordance with various embodiments, mechanisms (which can include methods, systems, and media) for presenting media content previews are provided.

In some embodiments, the mechanisms described herein can present a group of thumbnail content items that each represent a media content item that is available for viewing on a user device. For example, in some embodiments, the thumbnail content items can be presented in a page (e.g., a web page associated with a media content provider, and/or any other suitable page) that allows a user to browse available media content. In some embodiments, the thumbnail content item can include any suitable content, such as an image associated with the corresponding media content item, and/or any other suitable content.

In some embodiments, the thumbnail content items can be presented on any suitable user device. For example, in some embodiments, the thumbnail content items can be presented on a virtual reality headset device or on a head-mounted display device. As another example, in some embodiments, the thumbnail content items can be presented on any other suitable user device, such as a mobile phone, a tablet computer, a laptop computer, a desktop computer, and/or any other suitable user device.

In some embodiments, the mechanisms described herein can determine that a user has selected a thumbnail content item from the group of thumbnail content items. For example, in instances where the user device is a virtual reality headset device or a head-mounted display device, the mechanisms can determine that the thumbnail content item has been selected based on a viewpoint of the headset or user device, such as a direction or orientation of the headset or user device, and/or any other suitable direction information. In some embodiments, in response to determining that a particular thumbnail content item has been selected, the mechanisms can cause presentation of a preview of media content associated with the selected thumbnail content item to begin. For example, in some embodiments, the mechanisms can cause the thumbnail content items to no longer be presented on the display screen and can cause the preview of the media content to be presented on the display screen.

In some embodiments, the preview of the media content can be presented as spherical content. Note that, as described herein, spherical content refers to video content recorded from multiple views using any suitable number of cameras (e.g., one, two, five, and/or any other suitable number) that is stitched together to form an image that spans any suitable spatial range (e.g., 180 degrees, 270 degrees, 360 degrees, and/or any other suitable spatial range). More particularly, in some embodiments, multiple views in various directions can be recorded at the same time by one or more video capture devices, and the resulting video content can be stitched together to allow a user to change a view point of the spherical content. For example, in some embodiments, a user can manipulate a view point of the spherical content by rotating or moving a user device on which the spherical content is being displayed. As another example, in some embodiments, a user can manipulate a view point of the spherical content by clicking and/or dragging the spherical content, changing the user's gaze point (e.g., when utilizing a gaze-tracking device associated with a user device presenting the spherical content), and/or manipulate the spherical content in any other suitable manner, thereby causing a view point of the spherical content to be correspondingly rotated or shifted. As yet another example, in instances where the user device is a virtual reality headset device or a head-mounted display device, the user can navigate through the spherical content and/or manipulate the viewpoint of the spherical content by changing a head position (e.g., by tilting an angle of the user's head, by looking in a different direction, by stepping in a different direction, and/or in any other suitable manner). Additionally, as described herein, a view port of the spherical content can be described as a portion of the spherical content item viewed by a viewer located at a center of a sphere represented by the spherical content item looking in a particular direction.

In some embodiments, the mechanisms described herein can determine if a viewer of the spherical content has directed their viewpoint away from the presentation of the spherical content (e.g., by looking in a different direction, and/or in any other suitable manner). In response to detecting that the viewer has directed their viewpoint away from the presentation of the spherical content, the mechanisms described herein can cause presentation of the thumbnail content items to resume, thereby allowing the user to select a different thumbnail content item to preview the associated media content, or resume browsing the available media content items. Embodiments may therefore provide a guided human-machine interface that assists a user in navigating a user interface. The user may therefore be able to quickly and easily navigate a group of thumbnail content items that each represent a media content item in a virtual environment.

Turning to FIG. 1A, an illustrative example 100 of a user interface for presenting previews of available media content items is shown in accordance with some embodiments of the disclosed subject matter. As illustrated, in some embodiments, user interface 100 can be presented as a web page that allows a viewer of user interface 100 to browse through available media content items (e.g., videos, television shows, movies, audio content items, and/or any other suitable media content items).

In some embodiments, user interface 100 can include any suitable content, such as thumbnail images 102, 104, and/or 106. In some such embodiments, each thumbnail content item can correspond to an available media content item. For example, in some embodiments, the thumbnail content item can include an image associated with the media content item, such as a screen-capture from the media content item, an image uploaded by the creator of the media content item to represent the media content item, and/or any other suitable image. In some embodiments, the thumbnail image can be a collection of images, such as a group of images stitched together to form an animation or video, a slideshow of images, and/or any other suitable collection of images. Note that, in some embodiments, each indication of available media content can include any other suitable content, such as a title of the associated media content item, a name of a creator of the media content item, a number of views of the media content item, a date associated with creation of the media content item, and/or any other suitable content.

In some embodiments, a user can select a particular indication of an available media content item, such as one of thumbnail images 102, 104, and/or 106, as shown in FIG. 1A. In some embodiments, the user can select the particular media content item in any suitable manner. For example, in some embodiments, the user can select the media content item by orienting the user device or headset in a particular direction, looking in a particular direction associated with the preview item, and/or in any other suitable manner. As another example, in some embodiments, the user can select the preview item using a touch screen, a mouse, and/or in any other suitable manner. In some embodiments, in response to determining that the particular media content item indication has been selected, the preview of the corresponding media content item can then be presented as spherical content, as shown in FIGS. 1B and 1C.

Figure 1B:
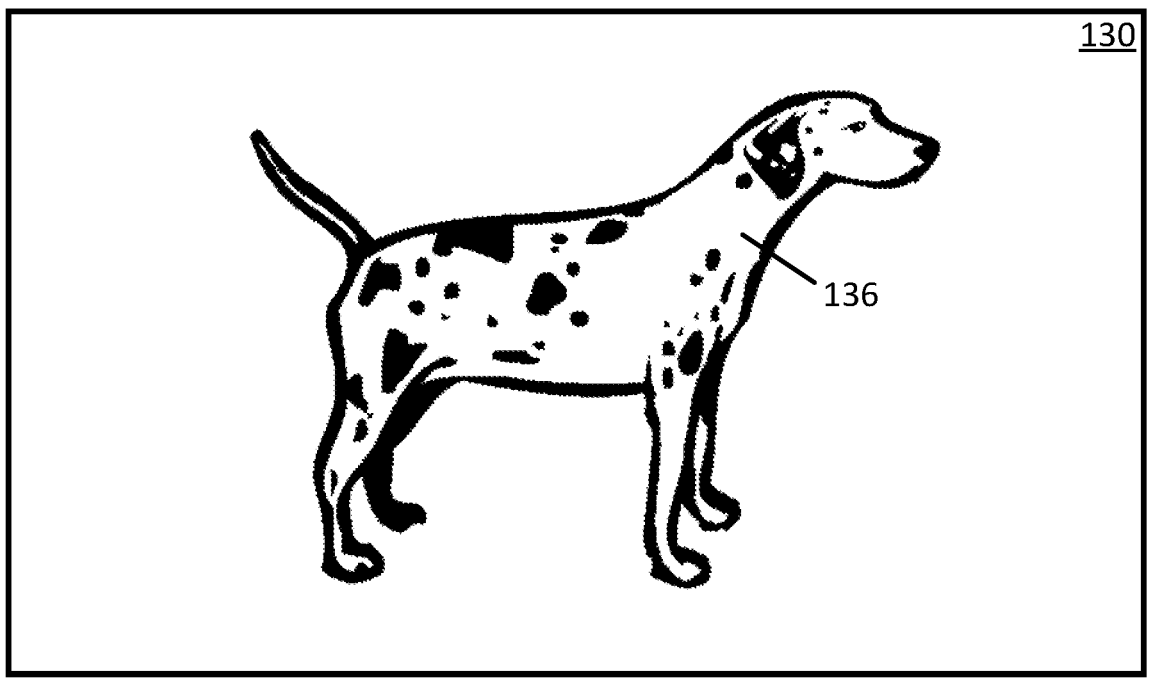
Figure 1C:
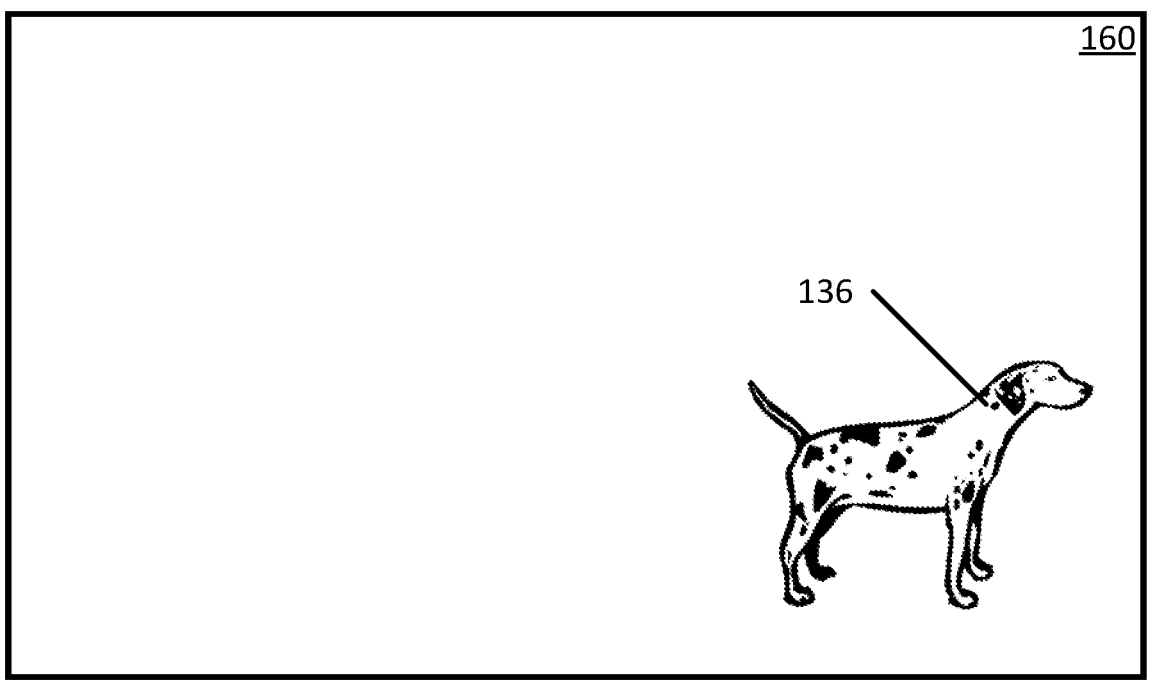

As shown in user interface 130 of FIG. 1B, a media content preview can be presented, and can include, for example, content 136. In some embodiments, content 136 can be spherical content that can include content that was captured from multiple views or cameras (e.g., two, three, four, and/or any other suitable number) and that has been stitched together using any suitable technique(s). In some such embodiments, a viewer of content 136 can navigate through the spherical content in any suitable manner, such as by turning or moving the user device in different directions, looking in different directions via a virtual reality device or head-mounted display, by selecting and dragging content 136, and/or in any other suitable manner. In some embodiments, in response to determining that the viewer of content 136 has changed a viewpoint of user interface 130, an updated view of content 136 can be presented, as shown in user interface 160 of FIG. 1C. For example, in some embodiments, a view port of the spherical content can be changed, thereby changing a position of content 136. As a more particular example, in some embodiments, content 136 can be presented at a different location within the view of the media content item. As another example, additional content can be presented within the display.

Figure 2:
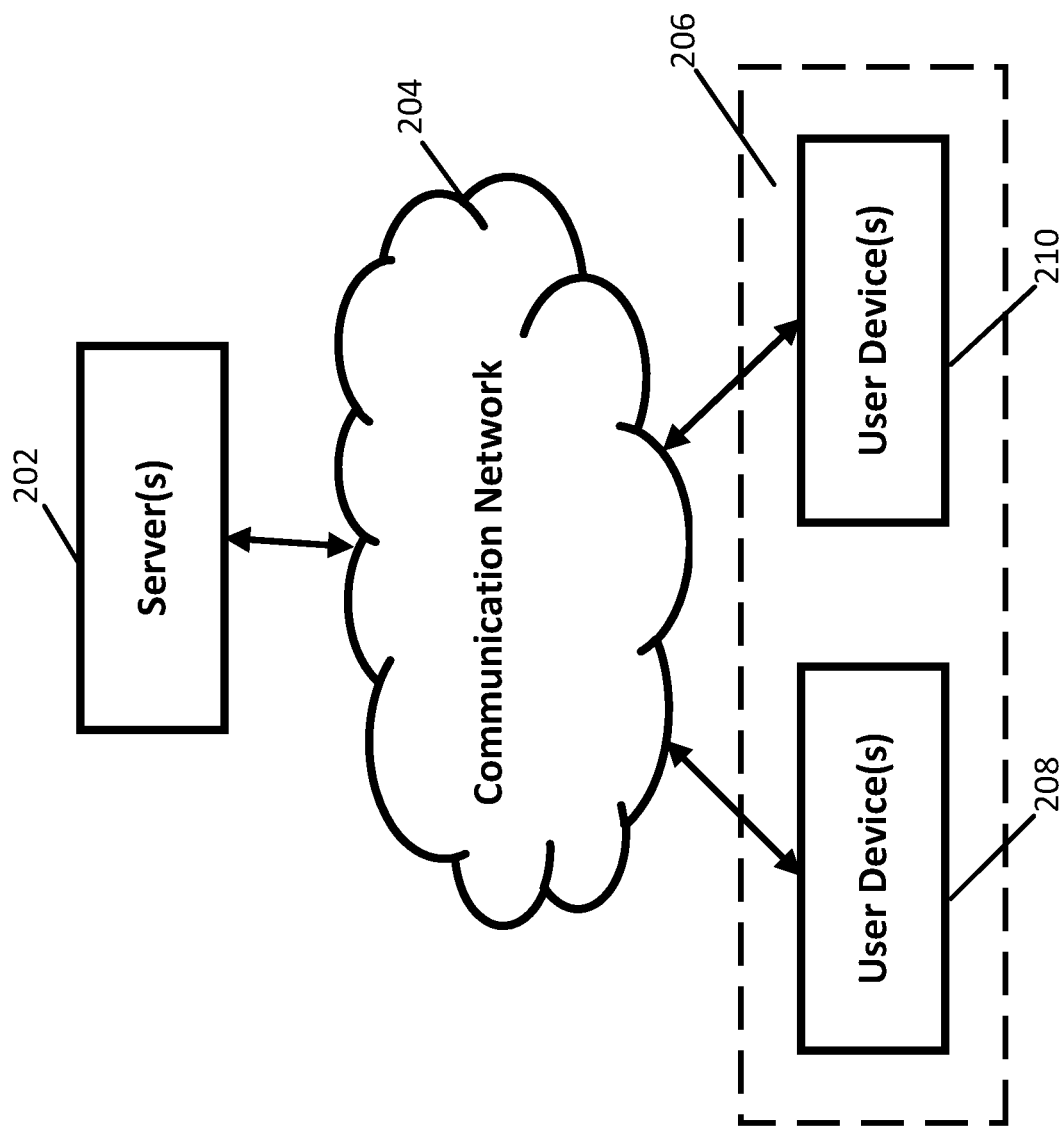
FIG. 2 shows a schematic diagram of an illustrative system suitable for implementation of mechanisms described herein for presenting media content previews in accordance with some embodiments of the disclosed subject matter.

Turning to FIG. 2, an example 200 of hardware for presenting media content previews that can be used in accordance with some embodiments of the disclosed subject matter is shown. As illustrated, hardware 200 can include one or more servers 202, a communication network 204, and/or one or more user devices 206, such as user devices 208 and 210.

Server(s) 202 can be any suitable server(s) for storing and/or providing media content to user devices 206. For example, in some embodiments, server(s) 202 can store media content, such as videos, television programs, movies, live-streamed media content, audio content, and/or any other suitable media content. In some embodiments, server(s) 202 can transmit a media content item to a user device 206 in response to a request from user device 206. In some embodiments, server(s) 202 can provide a web page that allows a user of user device 206 to browse available media content items. For example, in some embodiments, server(s) 202 can provide a page that includes indications of one or more media content items, by providing a thumbnail image associated with each media content item, a title associated with each media content item, and/or any other suitable information, as shown in and described above in connection with FIG. 1A.

Communication network 204 can be any suitable combination of one or more wired and/or wireless networks in some embodiments. For example, communication network 204 can include any one or more of the Internet, an intranet, a wide-area network (WAN), a local-area network (LAN), a wireless network, a digital subscriber line (DSL) network, a frame relay network, an asynchronous transfer mode (ATM) network, a virtual private network (VPN), and/or any other suitable communication network. User devices 206 can be connected by one or more communications links to communication network 204 that can be linked via one or more communications links to server(s) 202. The communications links can be any communications links suitable for communicating data among user devices 206 and server(s) 202 such as network links, dial-up links, wireless links, hard-wired links, any other suitable communications links, or any suitable combination of such links.

User devices 206 can include any one or more user devices suitable for presenting previews of available media content items, detecting that a particular media content preview has been selected, causing a selected media content preview to be presented as spherical content, and/or any other suitable functions. For example, in some embodiments, user devices 206 can include a mobile device, such as a mobile phone, a tablet computer, a wearable computer, a laptop computer, a vehicle (e.g., a car, a boat, an airplane, or any other suitable vehicle) entertainment system, and/or any other suitable mobile device. As another example, in some embodiments, user devices 206 can include a media playback device, such as a television, a projector device, a game console, desktop computer, and/or any other suitable non-mobile device. As yet another example, in some embodiments, user devices 206 can include a virtual reality device or a head-mounted user device.

Although server(s) 202 is illustrated as one device, the functions performed by server(s) 202 can be performed using any suitable number of devices in some embodiments. For example, in some embodiments, multiple devices can be used to implement the functions performed by server(s) 202.

Although two user devices 208 and 210 are shown in FIG. 2 to avoid over-complicating the figure, any suitable number of user devices, and/or any suitable types of user devices, can be used in some embodiments.

Figure 3:
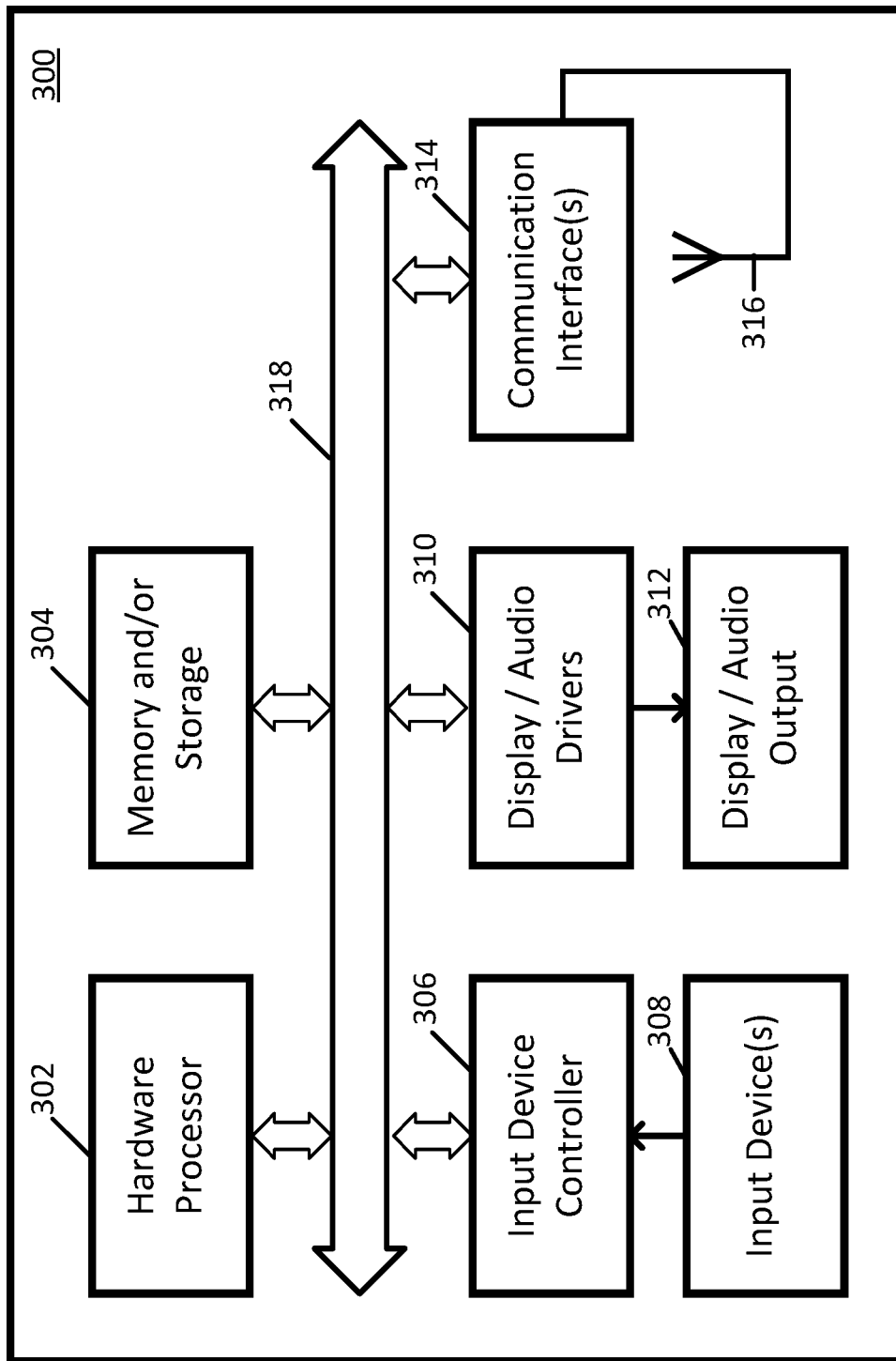
FIG. 3 shows a detailed example of hardware that can be used in a server and/or a user device of FIG. 2 in accordance with some embodiments of the disclosed subject matter.

Server(s) 202 and user devices 206 can be implemented using any suitable hardware in some embodiments. For example, in some embodiments, devices 202 and 206 can be implemented using any suitable general purpose computer or special purpose computer. For example, a mobile phone may be implemented using a special purpose computer. Any such general purpose computer or special purpose computer can include any suitable hardware. For example, as illustrated in example hardware 300 of FIG. 3, such hardware can include hardware processor 302, memory and/or storage 304, an input device controller 306, an input device 308, display/audio drivers 310, display and audio output circuitry 312, communication interface(s) 314, an antenna 316, and a bus 318.

Hardware processor 302 can include any suitable hardware processor, such as a microprocessor, a micro-controller, digital signal processor(s), dedicated logic, and/or any other suitable circuitry for controlling the functioning of a general purpose computer or a special purpose computer in some embodiments. In some embodiments, hardware processor 302 can be controlled by a server program stored in memory and/or storage 304 of a server (e.g., such as one of server(s) 202). For example, in some embodiments, the server program can cause hardware processor 302 to transmit indications of available media content items to user device 206. In some embodiments, hardware processor 302 can be controlled by a computer program stored in memory and/or storage 304 of user device 206. For example, the computer program can cause hardware processor 302 to detect that a user of user device 206 has selected a particular media content preview and can cause the selected media content preview to be presented as spherical content, and/or perform any other suitable actions.

Memory and/or storage 304 can be any suitable memory and/or storage for storing programs, data, media content, and/or any other suitable information in some embodiments. For example, memory and/or storage 304 can include random access memory, read-only memory, flash memory, hard disk storage, optical media, and/or any other suitable memory.

Input device controller 306 can be any suitable circuitry for controlling and receiving input from one or more input devices 308 in some embodiments. For example, input device controller 306 can be circuitry for receiving input from a touchscreen, from a keyboard, from a mouse, from one or more buttons, from a voice recognition circuit, from a microphone, from a camera, from an optical sensor, from an accelerometer, from a temperature sensor, from a near field sensor, and/or any other type of input device.

Display/audio drivers 310 can be any suitable circuitry for controlling and driving output to one or more display/audio output devices 312 in some embodiments. For example, display/audio drivers 310 can be circuitry for driving a touchscreen, a flat-panel display, a cathode ray tube display, a projector, a speaker or speakers, and/or any other suitable display and/or presentation devices.

Communication interface(s) 314 can be any suitable circuitry for interfacing with one or more communication networks, such as network 204 as shown in FIG. 2. For example, interface(s) 314 can include network interface card circuitry, wireless communication circuitry, and/or any other suitable type of communication network circuitry.

Antenna 316 can be any suitable one or more antennas for wirelessly communicating with a communication network (e.g., communication network 204) in some embodiments. In some embodiments, antenna 316 can be omitted.

Bus 318 can be any suitable mechanism for communicating between two or more components 302, 304, 306, 310, and 314 in some embodiments.

Any other suitable components can be included in hardware 300 in accordance with some embodiments.

Figure 4:
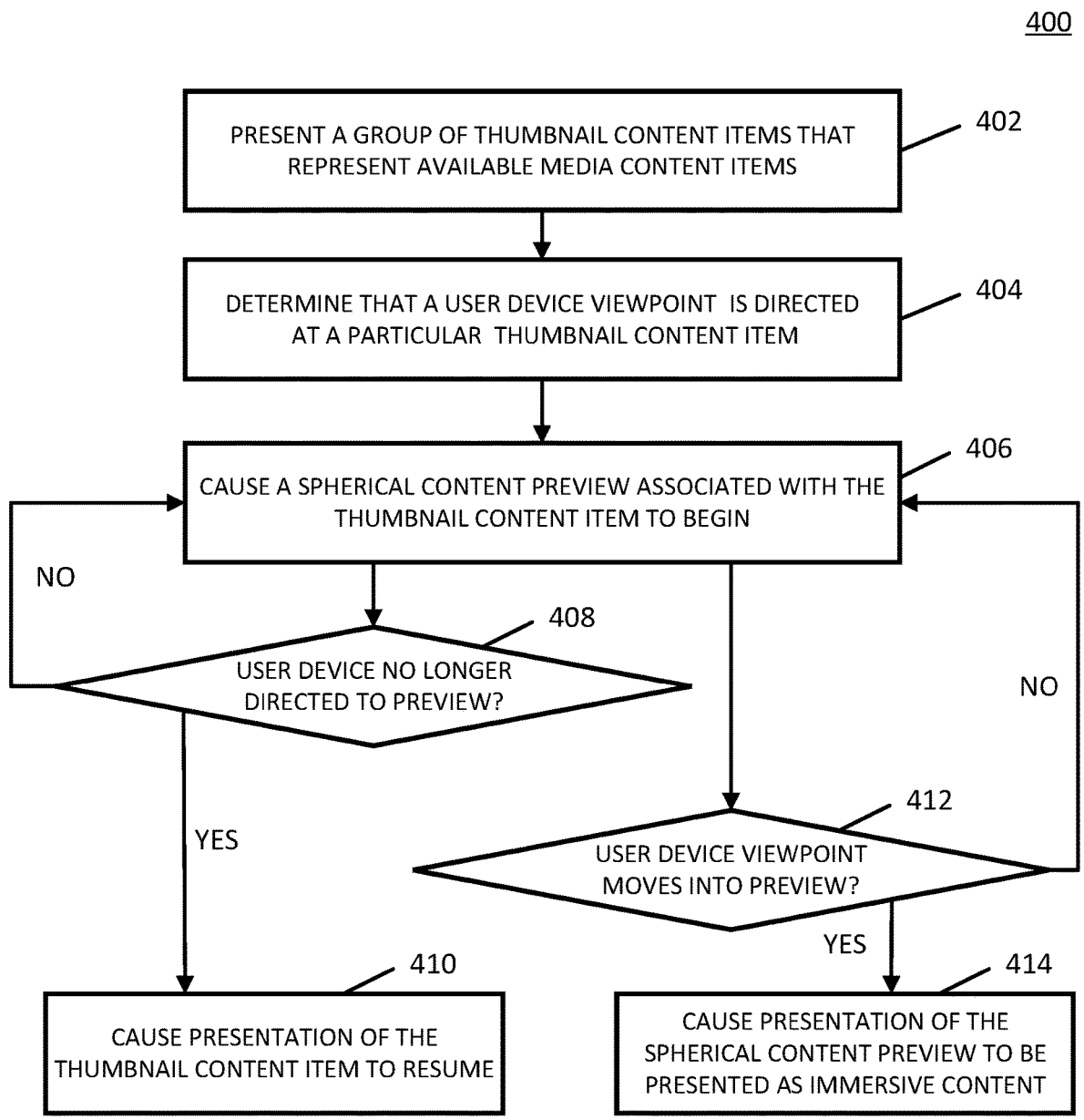
FIG. 4 shows an illustrative example of a process for presenting a group of available media content items and presenting a preview of a selected media content item as spherical content in accordance with some embodiments of the disclosed subject matter.

Turning to FIG. 4, an illustrative example 400 of a process for presenting indications of available media content items and, in response to receiving a selection of one of the indications, presenting a preview of the selected media content item, is shown in accordance with some embodiments of the disclosed subject matter. In some embodiments, blocks of process 400 can be implemented on a user device, such as a virtual reality device or a head-mounted display, a mobile device, and/or any other suitable type of user device.

At 402, process 400 can begin by presenting a group of thumbnail content items that each represent an available media content item on a user device. In some embodiments, the group of thumbnail content items can be presented in any suitable manner. For example, as shown in and described above in connection with FIG. 1A, the group of thumbnail content items can be presented within a page that allows a user of the user device to browse available media content. In some embodiments, the thumbnail content items can be presented in any suitable layout, such as in rows, columns, a carousel, in multiple rows and/or columns, grouped according to any suitable criteria (e.g., genre, popularity, related to previously viewed content, and/or in any other suitable manner). Additionally, in some embodiments, process 400 can present any other suitable information in connection with each thumbnail content item, such as a name of the associated media content item, a creator of the associated media content item, a number of views of the associated media content item, a duration of the associated media content item, a description of the associated media content item, and/or any other suitable information.

At 404, process 400 can determine that a viewpoint of a user device is directed at one thumbnail content item of the group of thumbnail content items. For example, in some embodiments, process 400 can detect that the user device is a device capable of presenting spherical content, such as a virtual reality headset device, and can determine that a headset associated with the user device is oriented in a direction that corresponds to the one thumbnail content item of the group of thumbnail content items. In some embodiments, process 400 can determine the direction of the viewpoint of the user device using any suitable technique or combination of techniques. For example, in some embodiments, process 400 can use a ray casting technique to determine if a line from any suitable point of a headset intersects with a portion the one thumbnail content item of the group of thumbnail content items. In some such embodiments, the line can be drawn from any suitable point of the headset, such as a location corresponding to eyes of a wearer of the headset, a location corresponding to a forehead of the wearer of the headset, and/or any other suitable position. As another example, in some embodiments, process 400 can determine an orientation of the user device based on any suitable data from motion sensors associated with the user device, such as a gyroscope, an accelerometer, and/or any other suitable sensor(s). In some such embodiments, process 400 can then determine whether the determined orientation of the user device corresponds to a location of the one thumbnail content item of the group of thumbnail content items. In some embodiments, any suitable event detector function or event handler function can be used to determine that the viewpoint of the user device is directed at the thumbnail content item, and, upon detection, causes process 400 to proceed to block 406.

In response to determining that the viewpoint of the user device is directed at one of the thumbnail content items in the group of thumbnail content items, process 400 can begin presenting a content preview associated with the selected thumbnail content item at 406. In some embodiments, the content preview can include spherical video content. Process 400 can begin presenting the content preview in any suitable manner. For example, in some embodiments, process 400 can inhibit presentation of the page of thumbnail content items on the user device and can cause spherical content associated with the selected thumbnail content item to be presented. In some embodiments, the spherical content can be presented in a full-screen mode on the display. Additionally, in some embodiments, the spherical content can be presented with any suitable audio content.

In some embodiments, the spherical content can be any suitable type of preview of the corresponding media content item. For example, in some embodiments, the spherical content can be a video of any suitable duration (e.g., ten seconds, thirty seconds, two minutes, and/or any other suitable duration). In some embodiments, the spherical content preview can be a subset or portion of the corresponding media content item. In some such embodiments, the subset or portion of the corresponding media content item can be selected in any suitable manner, for example, by a creator of the media content item, by an algorithm that selects interesting parts of the media content item, and/or in any other suitable manner. Note that, in some embodiments, the spherical content can be presented monoscopically or stereoscopically.

As described above, in some embodiments, the spherical content can include views from multiple views or cameras stitched together in any suitable manner. In some embodiments, a viewer of the spherical content can manipulate a viewpoint of the spherical content, for example, by moving the user device in different directions. As a more particular example, in some embodiments, process 400 can determine whether the viewpoint of the spherical content is to be changed based on a gyroscope associated with the user device or headset. As a specific example, in instances where process 400 determines (e.g., based on data recorded from the gyroscope, and/or based on any other suitable information) that a user of the user device has rotated their head or the user device by a certain angle or moved their head or user device by a certain amount, process 400 can cause the viewpoint of the spherical content to move by a corresponding angle or change in position. In some such embodiments, process 400 can cause a viewpoint of the spherical content to change corresponding to the manipulated viewpoint, as shown in and described above in connection with FIGS. 1B and 1C.

Note that, in some embodiments, the selected thumbnail content item may be associated with a media content item that is not a spherical content item (e.g., a media content item recorded from one view or camera, a media content item with a relatively limited angular view, and/or any other suitable media content item). In some such embodiments, process 400 can cause the selected thumbnail content item to be presented in a full-screen view on a display associated with the user device.

Process 400 can determine, at 408, whether the viewpoint of the user device is no longer directed at the spherical content preview. Similar to as described above in connection with block 404, process 400 can determine the viewpoint of the user device using any suitable technique or combination of techniques. For example, in some embodiments, process 400 can use a ray casting technique to determine whether a line drawn from any suitable point associated with the user device or headset no longer intersects with the presentation of the spherical content. As another example, process 400 can determine the viewpoint of the user device based on any suitable motion sensors associated with the user device, as described above in connection with block 404. Note that, in some embodiments, process 400 can determine whether the user is viewing the spherical content based on any other suitable information, such as whether the user is actively using a different user device, and/or based on any other suitable information.

If, at 408, process 400 determines that the viewpoint of the user device is directed at the spherical content preview ("no" at 408), process 400 can loop back to block 406 and can continue presenting the spherical content preview associated with the selected thumbnail content preview.

If, at 408, process 400 determines that the viewpoint of the user device is no longer directed at the spherical content preview ("yes" at 408), process 400 can proceed to block 410 and can cause presentation of the spherical content to be inhibited and presentation of the thumbnail content item and/or the group of thumbnail content items to resume on the display. For example, in some embodiments, process 400 can resume presenting the page that indicates thumbnail content items corresponding to available media content items, as described above in connection with block 402 and as shown in and described above in connection with FIG. 1A. In some embodiments, in instances where the spherical content was presented in connection with audio content, process 400 can inhibit presentation of the audio content when resuming presentation of the thumbnail content item(s). In some embodiments, process 400 can transition between presentation of the spherical content and the thumbnail content item(s) in any suitable manner. For example, in some embodiments, process 400 can transition from presentation of the spherical content preview to the thumbnail content item(s) using a fade, and/or any other suitable visual transition.

At 412, process 400 can determine whether the viewpoint of the user device has moved into the spherical content. That is, in some embodiments, process 400 can determine whether a user of the user device wants to enter the spherical content as a virtual reality space. As described above in connection with blocks 404 and 408, process 400 can determine the viewpoint of the user device using any suitable technique or combination of techniques. For example, as described above, in some embodiments, process 400 can use a ray casting technique to determine that the viewpoint of the user device has angled forward to move into the spherical content, stepped forward to move into the spherical content, and/or change in any other suitable manner. As another example, in some embodiments, process 400 can determine that the user device has been rotated or angled in a particular direction based on motion sensors (e.g., a gyroscope, an accelerometer, and/or any other suitable motion sensor) associated with the user device.

If, at 412, process 400 determines that the viewpoint of the user device has not moved into the spherical content ("no" at 412), process 400 can loop back to block 406 and can continue presenting the spherical content.

If, at 412, process 400 determines that the viewpoint of the user device has moved into the spherical content ("yes" at 412), process 400 can cause presentation of the spherical content to be modified in a manner that provides a view of the spherical content as a more immersive experience. For example, in some embodiments, process 400 can cause presentation of the spherical content to occupy a larger display area. As another example, in some embodiments, process 400 can activate associated audio content from one or more speakers associated with the user device. In some such embodiments, process 400 can cause the audio content to be rendered with any suitable sound effects that can, for example, cause the audio content to sound as if it is located at one or more points in a three-dimensional space around the user device. As a more particular example, in some embodiments, process 400 can use any suitable techniques (e.g., head-transfer functions, reverberation, and/or any other suitable techniques) to manipulate sound output from any suitable number of speakers associated with the user device to appear to originate from any other suitable location. As yet another example, in some embodiments, process 400 can cause the spherical content to be presented stereoscopically to cause the spherical content to appear three-dimensional. As a more particular example, the spherical content can be stored in any suitable manner that indicates a frame of content to be delivered to a left eye of the viewer and second frame of content to be delivered to a right eye of the viewer. In some such embodiments, in instances where process 400 begins stereoscopic presentation of the spherical content at 412, process 400 can select one of the two frames or interpolate between the two frames while presenting the spherical content monoscopically at block 406.

Note that, in some embodiments, a user of the user device can select a media content item for presentation at any suitable time point. For example, in some embodiments, rather than viewing a preview of the media content item at block 406, process 400 can select the media content item (e.g., from a web page presenting indications of available media content items), and process 400 can cause presentation of the media content item to begin without presenting a preview. As another example, in some embodiments, the user of the user device can select the media content item for presentation while viewing the spherical content preview at block 406. As yet another example, in some embodiments, the user of the user device can select the media content item for presentation at block 414, while viewing the spherical content preview in a more immersive manner. As still another example, in some embodiments, process 400 can cause presentation of the media content item to begin in response to determining that presentation of the spherical content preview has finished. In some embodiments, process 400 can present the media content item in any suitable manner. For example, in some embodiments, process 400 can cause the media content item to be presented as spherical content, stereoscopic content, and/or in any other suitable manner.

In some embodiments, at least some of the above described blocks of the process of FIG. 4 can be executed or performed in any order or sequence not limited to the order and sequence shown in and described in connection with the figures. Also, some of the above blocks of FIG. 4 can be executed or performed substantially simultaneously where appropriate or in parallel to reduce latency and processing times. Additionally or alternatively, some of the above described blocks of the process of FIG. 4 can be omitted.

In some embodiments, any suitable computer readable media can be used for storing instructions for performing the functions and/or processes herein. For example, in some embodiments, computer readable media can be transitory or non-transitory. For example, non-transitory computer readable media can include media such as magnetic media (such as hard disks, floppy disks, and/or any other suitable magnetic media), optical media (such as compact discs, digital video discs, Blu-ray discs, and/or any other suitable optical media), semiconductor media (such as flash memory, electrically programmable read-only memory (EPROM), electrically erasable programmable read-only memory (EEPROM), and/or any other suitable semiconductor media), any suitable media that is not fleeting or devoid of any semblance of permanence during transmission, and/or any suitable tangible media. As another example, transitory computer readable media can include signals on networks, in wires, conductors, optical fibers, circuits, any suitable media that is fleeting and devoid of any semblance of permanence during transmission, and/or any suitable intangible media.

In situations in which the systems described herein collect personal information about users, or make use of personal information, the users may be provided with an opportunity to control whether programs or features collect user information (e.g., information about a user's social network, social actions or activities, profession, a user's preferences, or a user's current location). In addition, certain data may be treated in one or more ways before it is stored or used, so that personal information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

Accordingly, methods, systems, and media for presenting media content previews are provided.

Although the invention has been described and illustrated in the foregoing illustrative embodiments, it is understood that the present disclosure has been made only by way of example, and that numerous changes in the details of implementation of the invention can be made without departing from the spirit and scope of the invention, which is limited only by the claims that follow. Features of the disclosed embodiments can be combined and rearranged in various ways.

What is claimed is:

1. A method for presenting media content previews, the method comprising:
    causing a plurality of thumbnail images to be presented on a webpage presented on a user device, wherein each thumbnail image represents a media content item available for presentation on the user device, and wherein the user device is associated with a headset display;
    determining that a viewpoint of the headset display is directed to one of the thumbnail images of the plurality of thumbnail images to be selected;
    in response to determining that the viewpoint of the headset display is directed to the one of the thumbnail images to be selected, causing a first view of a content preview corresponding to the selected one of the thumbnail images to be presented on the headset display, wherein the content preview of the selected one of the thumbnail images includes a second view that is different than and does not include the first view;
    detecting that the viewpoint of the headset display has changed in a direction toward the second view of the content preview of the selected one of the thumbnail images by determining that the headset display has been moved in a direction corresponding to the direction of the second view of the content preview;
    in response to detecting that the viewpoint of the headset display has changed in the direction toward the second view of the content preview of the selected one of the thumbnail images, causing the second view of the content preview of the selected one of the thumbnail images to be presented on the headset display;
    determining that the viewpoint of the headset display is no longer directed to the content preview; and
    in response to determining that the viewpoint of the headset display is no longer directed to the content preview, causing presentation of the second view of the content preview to be inhibited and causing presentation of the plurality of thumbnail images to resume on the headset display.

2. The method of claim 1, further comprising:
    determining that the viewpoint of the headset display has changed to be angled toward the content preview; and
    in response to determining that the viewpoint of the headset display has changed to be angled toward the content preview, causing presentation of the content preview to occupy a larger display area.

3. The method of claim 2, further comprising presenting the content preview as stereoscopic content.

4. The method of claim 1, further comprising causing audio content associated with the content preview to be presented in connection with presentation of the content preview.

5. The method of claim 1, wherein determining that the viewpoint of the headset display has changed toward the second view is based on data from a motion sensor associated with the headset display.

6. The method of claim 1, wherein causing presentation of the second view of the content preview to be inhibited and causing presentation of the plurality of thumbnail images to resume comprises fading from the second view of the content preview to the webpage that includes the plurality of thumbnail images to be selected.

7. The method of claim 1, wherein the content preview comprises a subset of the corresponding media content item.

8. A system for presenting media content previews, the system comprising:
    a memory; and
    a hardware processor that, when executing computer executable instructions stored in the memory, is configured to:
        cause a plurality of thumbnail images to be presented on a webpage presented on a user device, wherein each thumbnail image represents a media content item available for presentation on the user device, and wherein the user device is associated with a headset display;
        determine that a viewpoint of the headset display is directed to one of the thumbnail images of the plurality of thumbnail images to be selected;
        in response to determining that the viewpoint of the headset display is directed to the one of the thumbnail images to be selected, cause a first view of a content preview corresponding to the selected one of the thumbnail images to be presented on the headset display, wherein the content preview of the selected one of the thumbnail images includes a second view that is different than and does not include the first view;
        detect that the viewpoint of the headset display has changed in a direction toward the second view of the content preview of the selected one of the thumbnail images by determining that the headset display has been moved in a direction corresponding to the direction of the second view of the content preview;
        in response to detecting that the viewpoint of the headset display has changed in the direction toward the second view of the content preview of the selected one of the thumbnail images, cause the second view of the content preview of the selected one of the thumbnail images to be presented on the headset display;
        determine that the viewpoint of the headset display is no longer directed to the content preview; and
        in response to determining that the viewpoint of the headset display is no longer directed to the content preview, cause presentation of the second view of the content preview to be inhibited and causing presentation of the plurality of thumbnail images to resume on the headset display.

9. The system of claim 8, wherein the hardware processor is further configured to:
    determine that the viewpoint of the headset display has changed to be angled toward the content preview; and
    in response to determining that the viewpoint of the headset display has changed to be angled toward the content preview, cause presentation of the content preview to occupy a larger display area.

10. The system of claim 9, wherein the hardware processor is further configured to present the content preview as stereoscopic content.

11. The system of claim 8, wherein the hardware processor is further configured to cause audio content associated with the content preview to be presented in connection with presentation of the content preview.

12. The system of claim 8, wherein determining that the viewpoint of the headset display has changed toward the second view is based on data from a motion sensor associated with the headset display.

13. The system of claim 8, wherein causing presentation of the second view of the content preview to be inhibited and causing presentation of the plurality of thumbnail images to resume comprises fading from the second view of the content preview to the webpage that includes the plurality of thumbnail images to be selected.

14. The system of claim 8, wherein the content preview comprises a subset of the corresponding media content item.

15. A non-transitory computer-readable medium containing computer executable instructions that, when executed by a processor, cause the processor to perform a method for presenting media content previews, the method comprising:
   causing a plurality of thumbnail images to be presented on a webpage presented on a user device, wherein each thumbnail image represents a media content item available for presentation on the user device, and wherein the user device is associated with a headset display;
   determining that a viewpoint of the headset display is directed to one of the thumbnail images of the plurality of thumbnail images to be selected;
   in response to determining that the viewpoint of the headset display is directed to the one of the thumbnail images to be selected, causing a first view of a content preview corresponding to the selected one of the thumbnail images to be presented on the headset display, wherein the content preview of the selected one of the thumbnail images includes a second view that is different than and does not include the first view;
   detecting that the viewpoint of the headset display has changed in a direction toward the second view of the content preview of the selected one of the thumbnail images by determining that the headset display has been moved in a direction corresponding to the direction of the second view of the content preview;
   in response to detecting that the viewpoint of the headset display has changed in the direction toward the second view of the content preview of the selected one of the thumbnail images, causing the second view of the content preview of the selected one of the thumbnail images to be presented on the headset display;
   determining that the viewpoint of the headset display is no longer directed to the content preview; and
   in response to determining that the viewpoint of the headset display is no longer directed to the content preview, causing presentation of the second view of the content preview to be inhibited and causing presentation of the plurality of thumbnail images to resume on the headset display.

16. The non-transitory computer-readable medium of claim 15, wherein the method further comprises:
   determining that the viewpoint of the headset display has changed to be angled toward the content preview; and
   in response to determining that the viewpoint of the headset display has changed to be angled toward the content preview, causing presentation of the content preview to occupy a larger display area.

17. The non-transitory computer-readable medium of claim 16, wherein the method further comprises presenting the content preview as stereoscopic content.

18. The non-transitory computer-readable medium of claim 15, wherein the method further comprises causing audio content associated with the content preview to be presented in connection with presentation of the content preview.

19. The non-transitory computer-readable medium of claim 15, wherein determining that the viewpoint of the headset display has changed toward the second view is based on data from a motion sensor associated with the headset display.

20. The non-transitory computer-readable medium of claim 15, wherein causing presentation of the second view of the content preview to be inhibited and causing presentation of the plurality of thumbnail images to resume comprises fading from the second view of the content preview to the webpage that includes the plurality of thumbnail images to be selected.

21. The non-transitory computer-readable medium of claim 15, wherein the content preview comprises a subset of the corresponding media content item.

* * * * *